(12) United States Patent
Warkentin et al.

(10) Patent No.: US 10,564,983 B2
(45) Date of Patent: Feb. 18, 2020

(54) MULTIPROCESSOR INITIALIZATION VIA FIRMWARE CONFIGURATION

(71) Applicant: VMware, Inc., Palo Alto, CA (US)

(72) Inventors: Andrei Warkentin, Wakefield, MA (US); Harvey Tuch, Cambridge, MA (US); Cyprien Laplace, Cambridge, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 286 days.

(21) Appl. No.: 15/183,192

(22) Filed: Jun. 15, 2016

(65) Prior Publication Data

US 2017/0364365 A1 Dec. 21, 2017

(51) Int. Cl.
*G06F 9/4401* (2018.01)
*G01D 11/30* (2006.01)
*G06F 12/0842* (2016.01)
*H04N 5/225* (2006.01)

(52) U.S. Cl.
CPC ............ *G06F 9/4405* (2013.01); *G01D 11/30* (2013.01); *G06F 9/4401* (2013.01); *G06F 9/4403* (2013.01); *G06F 12/0842* (2013.01); *H04N 5/2254* (2013.01)

(58) Field of Classification Search
CPC .. G06F 3/0482; G06F 3/0485; G06F 3/04886; G06F 17/2735; G06F 9/4401; G06F 9/4403; G06F 9/4405; G06F 12/0842; G01D 11/30; H04N 5/2254
See application file for complete search history.

(56) References Cited

U.S. PATENT DOCUMENTS

| | | | | |
|---|---|---|---|---|
| 6,785,892 B1* | 8/2004 | Miller | ................... | G06F 15/167 712/203 |
| 8,078,862 B2* | 12/2011 | Zimmer | ................ | G06F 9/4405 713/1 |
| 2012/0089814 A1* | 4/2012 | Gupta | ..................... | G06F 9/445 712/30 |

* cited by examiner

*Primary Examiner* — Terrell S Johnson
(74) *Attorney, Agent, or Firm* — Patterson + Sheridan, LLP

(57) ABSTRACT

An example method of initializing a plurality of processors in a hardware platform of computing device for use by system software executing on the hardware platform includes: parsing a descriptor table that has been loaded into memory from firmware to identify an original boot protocol for initializing at least one secondary processor of the plurality of processors; creating at least one mailbox structure in the memory associated with the at least one secondary processor; causing the at least one secondary processor to execute secondary processor initialization code stored in the memory, the secondary processor initialization code implementing a mailbox-based boot protocol that uses the at least one mailbox structure to initialize the at least one secondary processor; and modifying the descriptor table to identify the mailbox-based boot protocol for initializing the at least one secondary processor in place of the original boot protocol.

20 Claims, 4 Drawing Sheets

MULTIPROCESSOR INITIALIZATION VIA FIRMWARE CONFIGURATION

BACKGROUND

Certain processor platforms, such as ARM®64 server platforms, can be compliant with specifications that mandate particular protocols for booting secondary processors. For example, an ARM®64 server platform can specify either Type 0 boot protocol referred to as "Power State Coordination Interface (PSCI)" or Type 1 boot protocol referred to as "Multiprocessor Startup for ARM Platforms." Some platforms, however, may implement custom boot protocols for starting secondary processors. For example, devices, such as set-top boxes, networking appliances, storage arrays, or other types of hardware appliances that include embedded ARM processors can employ custom boot protocols for starting secondary processors. Software to be developed and installed on various devices, such the aforementioned embedded devices, can be customized to support each custom boot protocol. However, this requires custom builds of the software, which can be time consuming and expensive.

SUMMARY

One or more embodiments relate to a method of initializing a plurality of processors in a hardware platform of a computing device for use by system software executing on the hardware platform. The method includes parsing a descriptor table that has been loaded into memory from firmware to identify an original boot protocol for initializing at least one secondary processor of the plurality of processors, the plurality of processors including a primary processor and the at least one secondary processor. The method further includes creating at least one mailbox structure in the memory associated with the at least one secondary processor. The method further includes causing the at least one secondary processor to execute secondary processor initialization code stored in the memory, the secondary processor initialization code implementing a mailbox-based boot protocol that uses the at least one mailbox structure to initialize the at least one secondary processor. The method further includes modifying the descriptor table to identify the mailbox-based boot protocol for initializing the at least one secondary processor in place of the original boot protocol.

Further embodiments include a non-transitory computer-readable storage medium storing instructions that, when executed by a computing device, cause the computing device to perform the method set forth above, and a computing device programmed to carry out the method set forth above.

DETAILED DESCRIPTION

Figure 1:
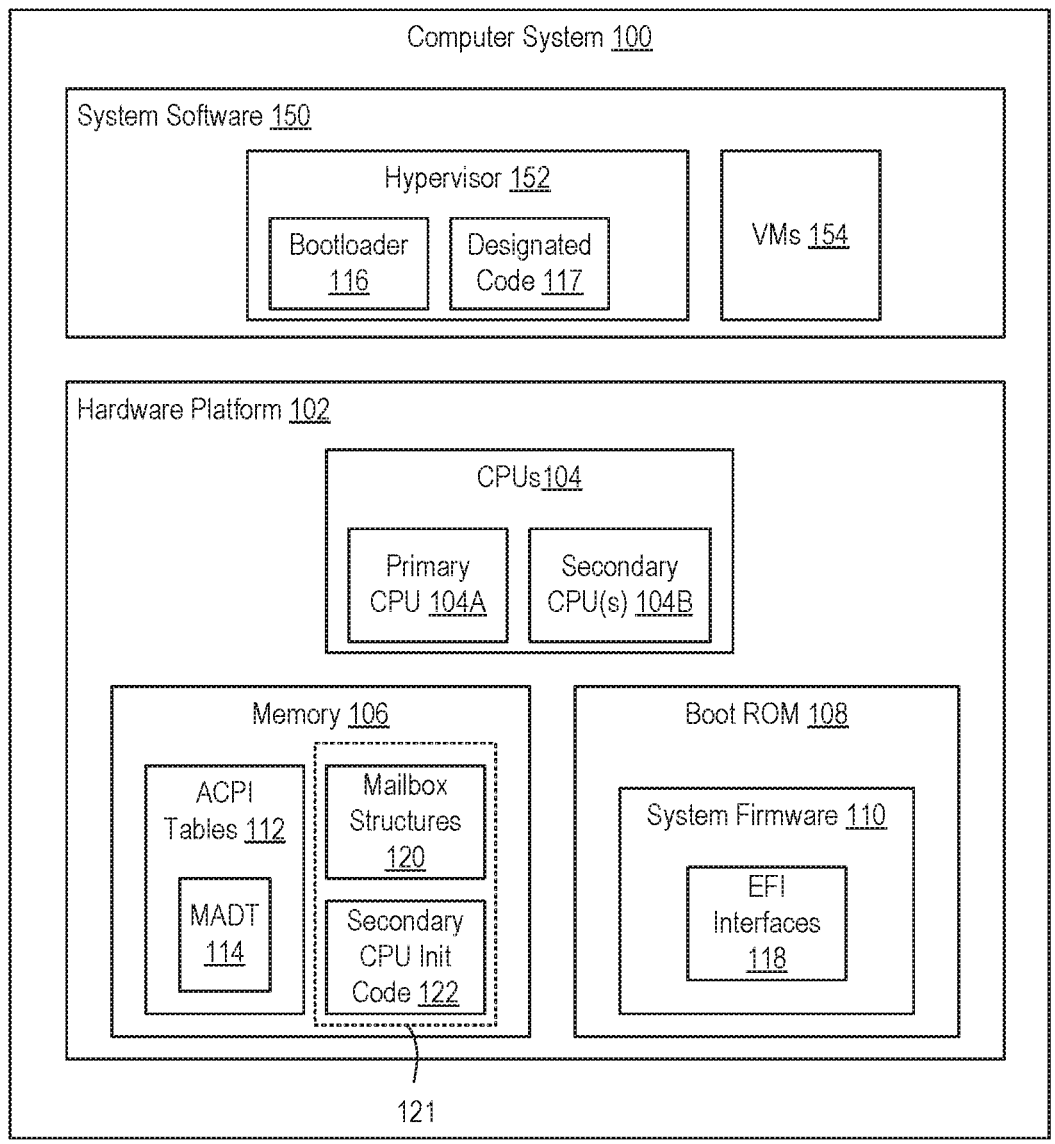
FIG. 1 is a block diagram of a computer system according to an embodiment.

FIG. 1 is a block diagram of a computer system 100 according to an embodiment. Computer system 100 includes system software 150 executing on a hardware platform 102. Hardware platform 102 includes central processing units (CPUs) 104, system memory 106 (also referred to as "memory 106"), and boot read only memory (ROM) 108. CPUs 104 include a primary CPU 104A and one or more secondary CPUs 104B. Primary CPU 104A is also referred to as a "boot CPU" and secondary CPUs 104B are also referred to as "application CPUs." CPUs 104 are configured to execute instructions, for example, executable instructions that perform one or more operations described herein and may be stored in system memory 106. CPUs 104 can include multiple discrete microprocessors or multiple "cores" of a microprocessor. The terms "CPU" and "processor" are used interchangeably herein. System memory 106 is a device allowing information, such as executable instructions and data to be stored and retrieved. System memory 106 may include, for example, one or more random access memory (RAM) modules. Boot ROM 108 comprises a persistent memory, such as one or more non-volatile memory modules.

In an embodiment, system software 150 comprises a hypervisor 152. Hypervisor 152 is virtualization software that abstracts processor, memory, storage, and networking resources of hardware platform 102 into multiple virtual machines (VMs) 154 that run concurrently on computer system 100. VMs 154 run on top of hypervisor 152, which implements platform virtualization and enables sharing of the hardware resources of computer system 100 by VMs 154. One example of hypervisor 152 that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 154 supports execution of a guest operating system (OS), which can be any commodity operating system known in the art, such as Linux®, Microsoft Windows®, Mac OS®, or the like.

In the example shown, hypervisor 152 is a Type-1 hypervisor (also referred to as a "bare-metal hypervisor") that executes directly on hardware platform 102. In other embodiments, hypervisor 152 is a Type-2 hypervisor (also referred to as a "hosted hypervisor") that executes on an operating system (OS). One example of a Type-2 hypervisor that may be configured and used in embodiments described herein is VMware Workstation Pro™ made commercially available from VMware, Inc. (although it should be recognized that any other hosted hypervisor can be used consistent with the teachings herein, such as VirtualBox® or the like). The term "hypervisor" as used herein encompasses both Type-1 and Type-2 hypervisors, as well as hybrids thereof (e.g., a Kernel-based Virtual Machine (KVM) infrastructure operating on a Linux® kernel).

Boot ROM 108 stores system firmware 110. System firmware 110 comprises the initial instructions executed by the primary CPU 104A. In an embodiment, system firmware 110 is compliant with an Extensible Firmware Interface (EFI) specification and includes one or more EFI interfaces 118. Although EFI firmware is described as an example, other types of firmware can be used in computer system 100, such as basic input/output system (BIOS) firmware or the like. Upon system power-on, primary CPU 104A begins executing instructions included in system firmware 110. System firmware 110 can causes secondary CPU(s) 104B to be in a parked state so as to not interfere with execution of system firmware 110 by primary CPU 104A.

Hypervisor 152 includes a bootloader 116. During system boot, system firmware 110 hands off the boot process to bootloader 116. Bootloader 116 includes instructions executed by CPUs 104 for execution of designated code 117 of hypervisor 152. After the handoff from system firmware 110, bootloader 116 initially executes on primary CPU 104A. Secondary CPU(s) 104B can remain in the parked state. As described further herein, bootloader 116 is further configured to initialize secondary CPU(s) 104B. While system software 150 is described herein as including hypervisor 152, in other embodiments, system software 150 can include a commodity operating system rather than a hypervisor. Such an operating system can include a bootloader configured similarly to bootloader 116 described herein. Thus, while hypervisor 152 is described in embodiments herein, it is to be understood that the techniques for initializing secondary processors described herein can be employed with other types of operating systems.

During the boot process, system firmware 110 generates advanced configuration and power interface (ACPI) tables 112, which are stored in system memory 106. ACPI tables 112 describe various aspects of hardware platform 102 and can be read by bootloader 116 and hypervisor 152. ACPI tables 112 obviate the need for hypervisor 152 to have detailed knowledge of power management and device discovery within hardware platform 102. ACPI tables 112 can include various tables, including a top-level table that includes pointers to all other tables (referred to as an Extended System Description Table (XSDT)). ACPI tables 112 include another table, referred to as the Multiple APIC Description Table (MADT) 114, which describes all of the interrupt controllers in the system. MADT 114 can be used to enumerate the available processors in the system.

In some embodiments, MADT 114 can also describe the boot protocol for initializing secondary CPUs 104B. For example, MADT 114 can include a Generic Interrupt Controller (GIC) structure for each CPU 104. The GIC includes one or more fields that specify the boot protocol. For example, MADT 114 can specify either Type 0 (PSCI) or Type 1 (Multiprocessor Startup for ARM Platforms) boot protocols. However, for some devices (e.g., embedded devices), MADT 114 can specify a custom boot protocol for initializing secondary CPUs 104B (rather than the standard Type 0 or Type 1). While MADT 114 is described in various embodiments herein, in general, any type of descriptor table that specifies the boot protocol used to initialize secondary processors can be employed.

Figure 2:
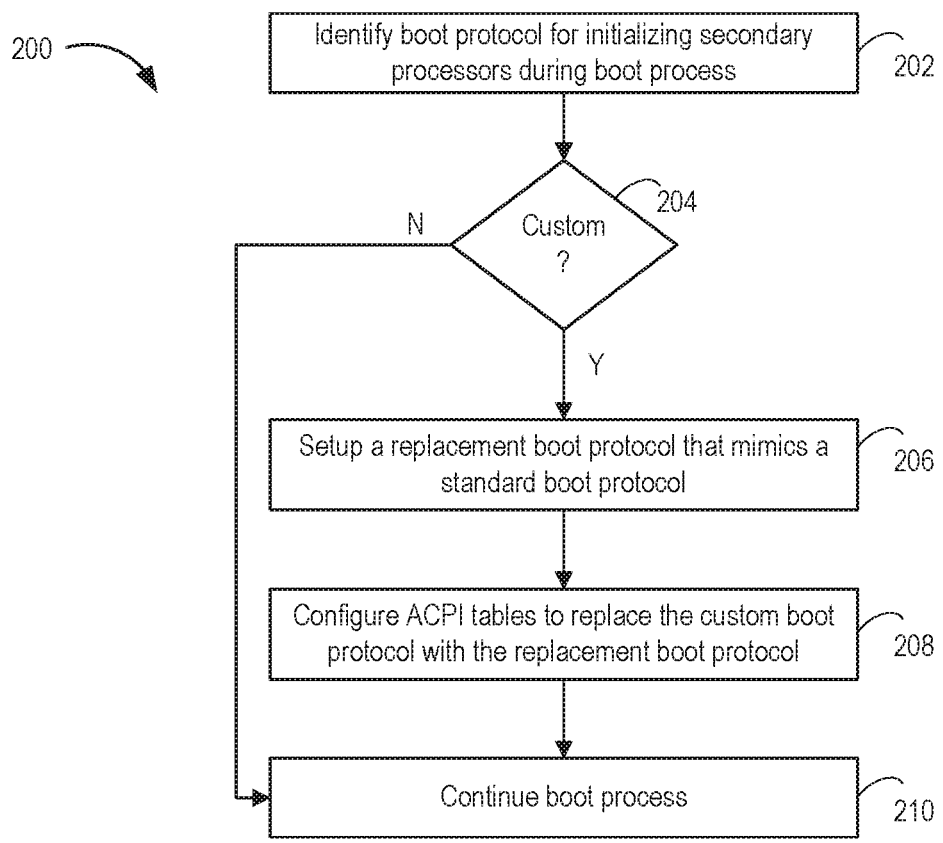
FIG. 2 is a flow diagram depicting a method of initializing secondary processors during a boot process according to an embodiment.

FIG. 2 is a flow diagram depicting a method 200 of initializing secondary processors during a boot process according to an embodiment. Method 200 can be performed by bootloader 116 described above. Method 200 begins at step 202, where bootloader 116 parses a descriptor table to identify a boot protocol for initializing the secondary processors during the boot process. In an embodiment, bootloader 116 parses MADT 114 to identify the boot protocol to be used.

Figure 5:
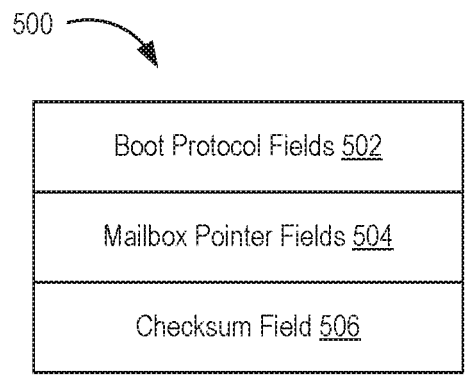
FIG. 5 is a block diagram depicting a portion of a descriptor table according to an embodiment.

FIG. 5 is a block diagram depicting a portion 500 of MADT 114 according to an embodiment. MADT 114 includes, among other fields, boot protocol fields 502, mailbox pointer fields 504, and checksum field 506. MADT 114 can include boot protocol fields 502 and mailbox pointer fields 504 as part of GIC entries. Checksum field 506 can be part of a header. Each of boot protocol fields 502 and mailbox pointer fields 504 can include a field for each of CPUs 104.

Returning to FIG. 2, at step 204, bootloader 116 determines whether the boot protocol is a custom boot protocol or a standard boot protocol. As noted above, MADT 114 can indicate the type of boot protocol. Bootloader 116 accesses MADT 114 stored in memory 106 to identify the boot protocol. A standard boot protocol is a boot protocol known to hypervisor 152, such as a Type 0 or Type 1 boot protocol described above. A custom boot protocol is a boot protocol that is unknown to hypervisor 152. If bootloader 116 determines that the boot protocol indicated in MADT 114 is a custom boot protocol, method 200 proceeds to step 206. Otherwise, method 200 proceeds to step 210, where bootloader 116 continues with the boot process, which results in execution of the known boot protocol (e.g., a Type 0 or Type 1 boot protocol).

At step 206, bootloader 116 configures hardware platform 102 to implement a replacement boot protocol that mimics a standard boot protocol. An embodiment of step 206 is described below. At step 208, bootloader 116 configures ACPI tables 112 to replace the custom boot protocol with the replacement boot protocol. An embodiment of step 208 is described below. In an embodiment, bootloader 116 modifies MADT 114 to implement the replacement boot protocol rather than the custom boot protocol. After step 208, method 200 proceeds to step 210, where bootloader 116 continues with the boot process, which results in execution of the replacement boot protocol. In this manner, bootloader 116 can initialize secondary CPU(s) 104B without being modified to support a custom boot protocol. This allows bootloader 116 to be standardized across a number of different types of devices, some of which employ various custom boot protocols for initializing secondary processors.

Figure 3:
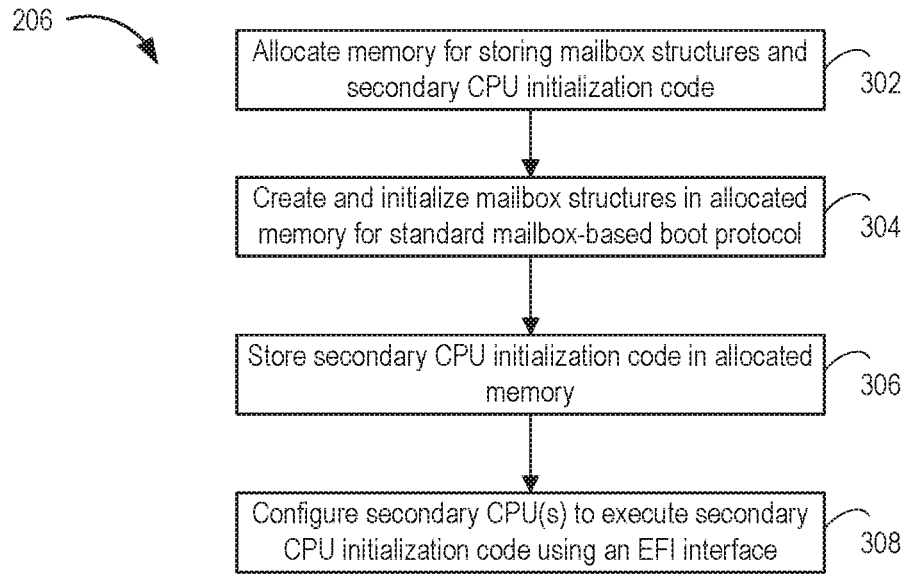
FIG. 3 is a flow diagram depicting a method of configuring a hardware platform to implement a replacement boot protocol according to an embodiment.

FIG. 3 is a flow diagram depicting a method 206 of configuring hardware platform 102 to implement a replacement boot protocol according to an embodiment. Bootloader 116 can implement the method of FIG. 3 as step 206 in method 200 described above. At step 302, bootloader 116 allocates memory for storing mailbox structures and secondary CPU initialization code. For example, bootloader 116 can allocate a portion 121 of memory 106. In an embodiment, portion 121 of memory 106 is marked as being in use by system firmware 110. In this manner, portion 121 of memory 106 will not be reclaimed by system software 150 during subsequent steps of the boot process.

At step 304, bootloader 116 creates and initializes mailbox structures 120 within portion 121 of memory 106. In an embodiment, the replacement boot protocol is a mailbox-based boot protocol for initializing secondary processors. A mailbox-based boot protocol defines a series of data structures, known as mailboxes or mailbox structures, for each CPU in the hardware platform. Each mailbox structure includes a field that specifies an address of code to be executed by a respective CPU. Bootloader 116 creates mailbox structures 120 for CPUs 104. Bootloader 116 then initializes the fields of mailbox structures 120 to include addresses of code to be executed by CPUs 104, including addresses of designated code 117 in system software 150 to be executed by secondary CPUs 104B. In this manner, bootloader 116 creates a replacement boot protocol that mimics a mailbox-based boot protocol, such as a Type 1 boot protocol described above.

Figure 6:
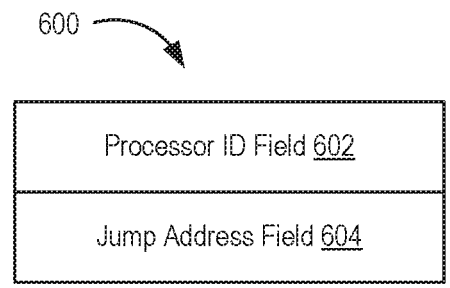
FIG. 6 is a block diagram depicting a portion of a mailbox structure according to an embodiment.

FIG. 6 is a block diagram depicting a portion 600 of a mailbox structure 120 according to an embodiment. Portion 600 of mailbox structure 120 includes a processor ID field 602 and a jump address field 604. Processor ID field 602 identifies one of CPUs 104 in hardware platform 102. Jump address field 604 includes a starting address for code to be executed by one of CPUs 104. In step 304, jump address field 604 in each mailbox structure 120 is initialized with an address of designated code 117 of hypervisor 152.

Returning to FIG. 3, at step 306, bootloader 116 stores secondary CPU initialization code 122 in portion 121 of memory 106. Secondary CPU initialization code 122 can include one or more portions to be executed by one or more secondary CPU(s) 104B, respectively, to implement a mailbox-based boot protocol for each of secondary CPU(s) 104B.

At step 308, bootloader 116 configures secondary CPU(s) 104B to execute secondary CPU initialization code 122 using an EFI interface 118. In an embodiment, EFI interfaces 118 include one or more interfaces that can be used to execute custom code. For example, in an ARM®64 system can include an EFI_MP_SERVICES_PROTOCOL interface and/or an ARM_PROCESSOR_TABLE interface. The EFI_MP_SERVICES_PROTOCOL interface is a high-level interface used to manipulate CPUs. The ARM_PROCESSOR_TABLE interface provides a lower-level interface that controls all secondary CPUs in the system. In general, bootloader 116 can use any type of EFI interface that allows for the execution of custom code on secondary CPU(s) 104B. In cases where there are no EFI interfaces to enable execution of custom code (e.g., non-EFI firmware or EFI firmware without EFI interface 118), bootloader 116 can be hard-coded with knowledge of the platform to specifically cause secondary CPU(s) 104B to execute secondary CPU initialization code 122. Even in such a case, only bootloader 116 would need to be customized for such firmware without EFI interface 118 (as opposed to hypervisor 152).

Secondary CPU initialization code 122 is configured to implement the mailbox-based boot protocol. In an embodiment, secondary CPU initialization code 122, when executed, initializes a secondary CPU 104B and causes a secondary CPU 104B to sleep until signaled to process the assigned mailbox structure. An embodiment of secondary CPU initialization is described below with respect to FIG. 7.

Figure 4:
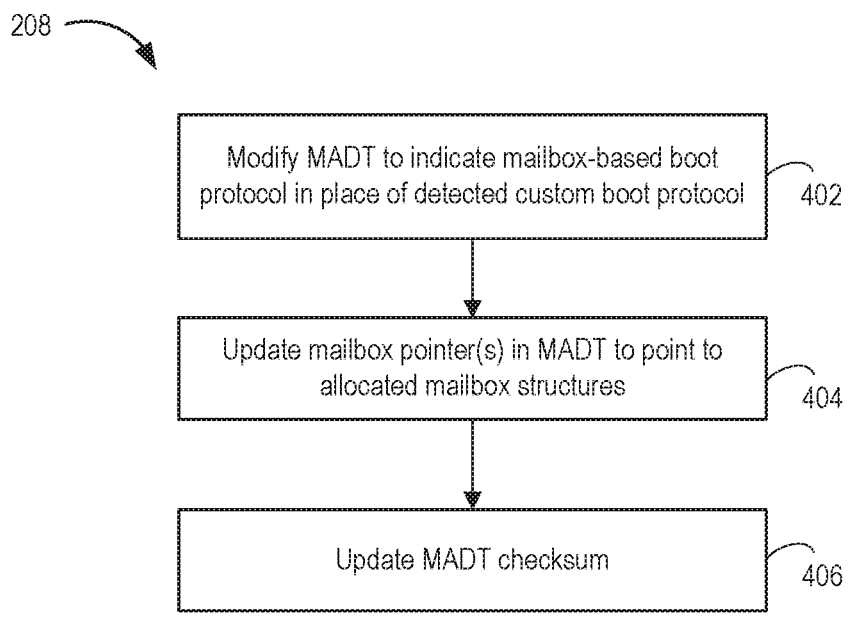
FIG. 4 is a flow diagram depicting a method of configuring ACPI tables to replace a detected custom boot protocol with a replacement boot protocol for initialization of secondary processors according to an embodiment.

FIG. 4 is a flow diagram depicting a method 208 of configuring ACPI tables 112 to replace a detected custom boot protocol with a replacement boot protocol for initialization of secondary processors according to an embodiment. Bootloader 116 can implement the method of FIG. 4 as step 208 in method 200 described above. At step 402, bootloader 116 modifies MADT 114 to indicate a mailbox-based boot protocol in place of the detected custom boot protocol. In an embodiment, bootloader 116 modifies boot protocol fields 502. At step 404, bootloader 116 updates mailbox pointers in MADT 114 to point to mailbox structures 120. In an embodiment, bootloader 116 modifies mailbox pointer fields 504. At step 406, bootloader 116 updates checksum field 506 of MADT 114 to be a valid checksum based on the modification of MADT 114 performed in steps 402 and 404. In this manner, any executing code that determines validity of MADT 114 will determine that MADT 114 as modified is valid.

Figure 7:
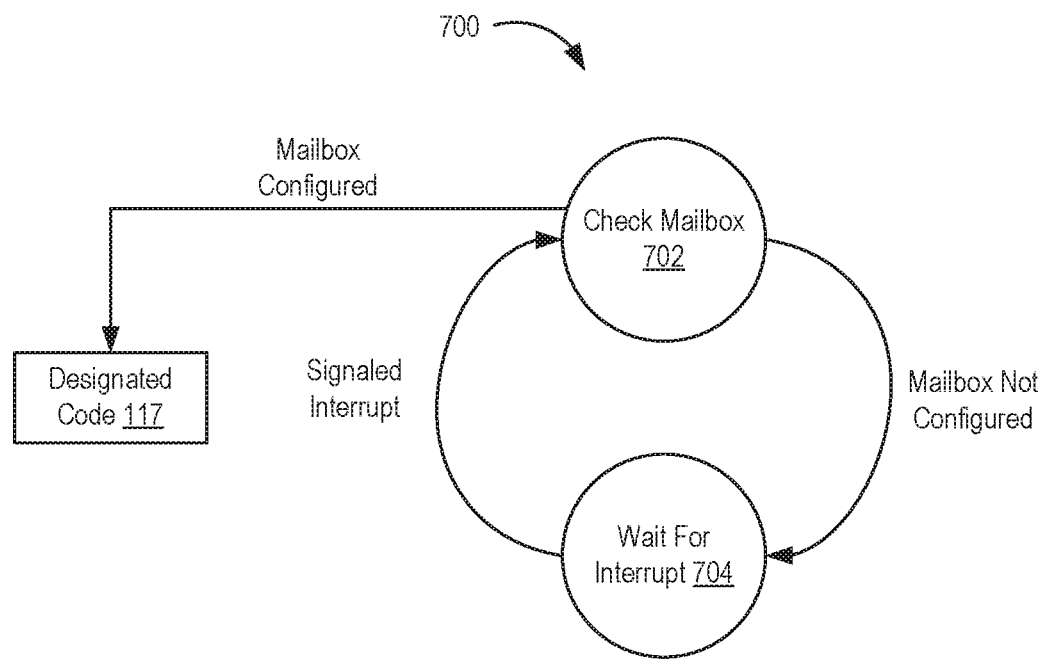
FIG. 7 is a state diagram depicting operation of secondary processor initialization code according to an embodiment.

FIG. 7 is a state diagram 700 depicting operation of secondary processor initialization code 122 according to an embodiment. Secondary processor initialization code 122 executes on each of secondary CPU(s) 104B as instructed by bootloader 116 during step 308 as described above. Secondary processor initialization code 122 implements the mailbox-based boot protocol by causing each of the at least one secondary processor to sleep until receiving an interrupt and, in response to the interrupt, accessing its associated mailbox structure. In an embodiment, at state 702, a secondary CPU 104B checks its associated mailbox structure 120. If the mailbox is not configured, secondary CPU 104B transitions to state 704. At state 704, secondary CPU 104B waits for an interrupt. When an interrupt is signaled, secondary CPU 104B transitions from state 704 to state 702. If the mailbox is configured, secondary CPU 104B transitions to execute designated code 117. A secondary CPU's mailbox is configured when both processor ID field 602 and jump address field 604 are initialized. Jump address field 604 includes an address that points to designated code 117. A secondary CPU 104B uses jump address field 604 to begin executing designated code 117. The interrupts for each secondary CPU 104B can be signaled by bootloader 116 after initialization and configuration of mailbox structures 120.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of initializing a plurality of processors in a hardware platform of computing device for use by system software executing on the hardware platform, the method comprising:
   parsing a descriptor table that has been loaded into memory from firmware to identify an original boot protocol for initializing at least one secondary processor of the plurality of processors, the plurality of processors including a primary processor and the at least one secondary processor;
   creating at least one mailbox structure in the memory associated with the at least one secondary processor;
   causing the at least one secondary processor to execute secondary processor initialization code stored in the memory, the secondary processor initialization code implementing a mailbox-based boot protocol that uses the at least one mailbox structure to initialize the at least one secondary processor; and
   modifying the descriptor table to identify the mailbox-based boot protocol for initializing the at least one secondary processor in place of the original boot protocol.

2. The method of claim 1, further comprising:
   allocating a portion of the memory to store the at least one mailbox structure and the secondary processor initialization code; and
   marking the allocated portion of the memory as being in use by the firmware.

3. The method of claim 2, further comprising:
   copying the secondary processor initialization code to the allocated portion of the memory by a bootloader of the system software.

4. The method of claim 1, wherein the step of creating the at least one mailbox structure comprises:
   storing an identifier of a respective one of the at least one secondary processor in a respective one of the at least one mailbox structure; and
   storing a jump address in each of the at least one mailbox structure that refers to designated code of the system software.

5. The method of claim 1, wherein the secondary processor initialization code is configured to implement the mailbox-based boot protocol by causing each of the at least one secondary processor to sleep until receiving an interrupt and, in response to the interrupt, accessing a respective one of the at least one mailbox structure.

6. The method of claim 1, wherein the step of causing the at least one secondary processor to execute the secondary processor initialization code comprises:
   invoking an interface of the firmware to control each the at least one secondary processor to begin executing the secondary processor initialization code.

7. The method of claim 1, wherein the step of modifying the descriptor table comprises:
   modifying an boot protocol identifier field to indicate the mailbox-based boot protocol in place of the original boot protocol;
   modifying at least one mailbox pointer field to refer to the at least one mailbox structure; and
   updating a checksum field of the descriptor table based the modification of the boot protocol identifier field and the at least one mailbox pointer field.

8. A non-transitory computer readable medium comprising instructions to be executed in a computing device to cause the computing device to carry out a method of initializing a plurality of processors in a hardware platform of the computing device for use by system software executing on the hardware platform, the method comprising:
   parsing a descriptor table that has been loaded into memory from firmware to identify an original boot protocol for initializing at least one secondary processor of the plurality of processors, the plurality of processors including a primary processor and the at least one secondary processor;
   creating at least one mailbox structure in the memory associated with the at least one secondary processor;
   causing the at least one secondary processor to execute secondary processor initialization code stored in the memory, the secondary processor initialization code implementing a mailbox-based boot protocol that uses the at least one mailbox structure to initialize the at least one secondary processor; and
   modifying the descriptor table to identify the mailbox-based boot protocol for initializing the at least one secondary processor in place of the original boot protocol.

9. The non-transitory computer readable medium of claim 8, further comprising:
   allocating a portion of the memory to store the at least one mailbox structure and the secondary processor initialization code; and
   marking the allocated portion of the memory as being in use by the firmware.

10. The non-transitory computer readable medium of claim 9, further comprising:
    copying the secondary processor initialization code to the allocated portion of the memory by a bootloader of the system software.

11. The non-transitory computer readable medium of claim 8, wherein the step of creating the at least one mailbox structure comprises:
    storing an identifier of a respective one of the at least one secondary processor in a respective one of the at least one mailbox structure; and
    storing a jump address in each of the at least one mailbox structure that refers to designated code of the system software.

12. The non-transitory computer readable medium of claim 8, wherein the secondary processor initialization code is configured to implement the mailbox-based boot protocol by causing each of the at least one secondary processor to sleep until receiving an interrupt and, in response to the interrupt, accessing a respective one of the at least one mailbox structure.

13. The non-transitory computer readable medium of claim 8, wherein the step of causing the at least one secondary processor to execute the secondary processor initialization code comprises:
   invoking an interface of the firmware to control each the at least one secondary processor to begin executing the secondary processor initialization code.

14. The non-transitory computer readable medium of claim 8, wherein the step of modifying the descriptor table comprises:
   modifying an boot protocol identifier field to indicate the mailbox-based boot protocol in place of the original boot protocol;
   modifying at least one mailbox pointer field to refer to the at least one mailbox structure; and
   updating a checksum field of the descriptor table based the modification of the boot protocol identifier field and the at least one mailbox pointer field.

15. A computing device including a hardware platform and system software, the hardware platform including a primary processor and at least one secondary processor, wherein the primary processor executes the system software to initialize the at least one secondary processor, by carrying out the steps of:
   parsing a descriptor table that has been loaded into memory from firmware to identify an original boot protocol for initializing at least one secondary processor of the plurality of processors, the plurality of processors including a primary processor and the at least one secondary processor;
   creating at least one mailbox structure in the memory associated with the at least one secondary processor;
   causing the at least one secondary processor to execute secondary processor initialization code stored in the memory, the secondary processor initialization code implementing a mailbox-based boot protocol that uses the at least one mailbox structure to initialize the at least one secondary processor; and
   modifying the descriptor table to identify the mailbox-based boot protocol for initializing the at least one secondary processor in place of the original boot protocol.

16. The device of claim 15, wherein the steps carried out by the primary processor further comprise:
   allocating a portion of the memory to store the at least one mailbox structure and the secondary processor initialization code; and
   marking the allocated portion of the memory as being in use by the firmware.

17. The device of claim 15, wherein the step of creating the at least one mailbox structure comprises:
   storing an identifier of a respective one of the at least one secondary processor in a respective one of the at least one mailbox structure; and
   storing a jump address in each of the at least one mailbox structure that refers to designated code of the system software.

18. The device of claim 15, wherein the secondary processor initialization code is configured to implement the mailbox-based boot protocol by causing each of the at least one secondary processor to sleep until receiving an interrupt and, in response to the interrupt, accessing a respective one of the at least one mailbox structure.

19. The device of claim 15, wherein the step of causing the at least one secondary processor to execute the secondary processor initialization code comprises:
   invoking an interface of the firmware to control each the at least one secondary processor to begin executing the secondary processor initialization code.

20. The device of claim 15, wherein the step of modifying the descriptor table comprises:
   modifying an boot protocol identifier field to indicate the mailbox-based boot protocol in place of the original boot protocol;
   modifying at least one mailbox pointer field to refer to the at least one mailbox structure; and
   updating a checksum field of the descriptor table based the modification of the boot protocol identifier field and the at least one mailbox pointer field.

* * * * *